(12) United States Patent
Watsen et al.

(10) Patent No.: US 8,060,592 B1
(45) Date of Patent: Nov. 15, 2011

(54) SELECTIVELY UPDATING NETWORK DEVICES BY A NETWORK MANAGEMENT APPLICATION

(75) Inventors: Kent A. Watsen, Redwood City, CA (US); Michael S. Jacobsen, Mountain View, CA (US); Tong Jiang, Fremont, CA (US); Xingang Huang, Campbell, CA (US); Darren Tom, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 788 days.

(21) Appl. No.: 11/288,412

(22) Filed: Nov. 29, 2005

(51) Int. Cl.
*G06F 15/173* (2006.01)
(52) U.S. Cl. .................. 709/223; 709/225; 717/107
(58) Field of Classification Search ............... 709/223
See application file for complete search history.

(56) References Cited

U.S. PATENT DOCUMENTS

| | | | | |
|---|---|---|---|---|
| 5,495,609 A * | 2/1996 | Scott | | 707/8 |
| 5,678,042 A * | 10/1997 | Pisello et al. | | 714/47 |
| 5,734,642 A * | 3/1998 | Vaishnavi et al. | | 370/255 |
| 6,052,382 A * | 4/2000 | Burke et al. | | 370/466 |
| 6,237,036 B1 * | 5/2001 | Ueno et al. | | 709/225 |
| 6,539,425 B1 * | 3/2003 | Stevens et al. | | 709/220 |
| 7,024,548 B1 * | 4/2006 | O'Toole, Jr. | | 713/1 |
| 7,222,147 B1 * | 5/2007 | Black et al. | | 709/200 |
| 7,246,163 B2 * | 7/2007 | Tindal | | 709/223 |
| 7,266,595 B1 * | 9/2007 | Black et al. | | 709/223 |
| 7,295,119 B2 * | 11/2007 | Rappaport et al. | | 340/572.4 |
| 2002/0032769 A1 * | 3/2002 | Barkai et al. | | 709/224 |
| 2003/0134675 A1 * | 7/2003 | Oberberger | | 463/29 |
| 2005/0132122 A1 * | 6/2005 | Rozas | | 711/100 |
| 2006/0031435 A1 * | 2/2006 | Tindal | | 709/220 |
| 2007/0073876 A1 * | 3/2007 | Shima | | 709/224 |
| 2007/0106912 A1 * | 5/2007 | Tanaka | | 713/193 |
| 2007/0198861 A1 * | 8/2007 | Minami et al. | | 713/194 |
| 2008/0152071 A1 * | 6/2008 | Morgia et al. | | 377/1 |
| 2008/0155509 A1 * | 6/2008 | Ohta et al. | | 717/127 |
| 2009/0043993 A1 * | 2/2009 | Ford et al. | | 712/216 |
| 2009/0169017 A1 * | 7/2009 | Smith et al. | | 380/278 |
| 2009/0217031 A1 * | 8/2009 | Kuhls et al. | | 713/153 |
| 2009/0217377 A1 * | 8/2009 | Arbaugh et al. | | 726/23 |

* cited by examiner

*Primary Examiner* — Firmin Backer
*Assistant Examiner* — Hamza Algibhah
(74) *Attorney, Agent, or Firm* — Harrity & Harrity, LLP

(57) ABSTRACT

A network device management application may manage a number of network devices. When managing the network devices, the management application may receive requests from administrators to modify a configuration of the network devices. In response, the management application may apply the requested modification to a model of the network device and synchronize configuration information of the model of the network device to the configuration information of the real network device using a configuration-based state machine.

19 Claims, 6 Drawing Sheets

NETWORK DEVICE 1:

NETWORK DEVICE 2:

•
•
•

NETWORK DEVICE K:

SELECTIVELY UPDATING NETWORK DEVICES BY A NETWORK MANAGEMENT APPLICATION

BACKGROUND

A. Field of the Invention

The principles of the invention relate generally to network device management and, more particularly, to configuring network devices.

B. Description of Related Art

In an increasingly networked world, devices that enable the network are becoming pervasive. Two examples of such devices are firewalls and routers. A firewall may generally be defined as a network gateway device that protects the resources of a private network from users associated with other networks. An enterprise with an intranet that allows its workers access to the Internet may install a firewall to prevent outsiders from accessing its own private data resources and for controlling what outside resources its own users can access. A router may generally be defined as a network device that determines the next network point to which network packets should be forwarded as the packets progress towards their final destination.

Some entities, such as large corporations, may manage a number of network devices. The devices may occasionally need to be reconfigured to implement different network management policies, network interfaces, or to update or change other device features. When dealing with multiple network devices, a management application can be used to assist in configuring the network devices and monitoring the status of the network devices. The management application communicates with each of the network devices and can present a single interface through which administrators can control and monitor the network.

Some network devices may be configured or modified without using the management application, which will be called an out-of-band modification herein. For example, a user may directly login to a particular network device and change a configuration of the network device. The out-of-band changes may be made while the device is online or when the device is off-line relative to the management application (e.g., during a network outage caused by a failure of an intermediate router).

An administrator using the management application may request that a single change be made to many different network devices. Not all of these network devices may be online when the administrator requests that the change is made.

In order to keep an up-to-date view of the network, it is desirable that the management application be able to efficiently and automatically learn about out-of-band device modifications and that the management application be able to accurately update the network devices as soon as possible.

SUMMARY OF THE INVENTION

One aspect is directed to a method for administrating network devices. The method includes presenting a management interface through which network devices are managed and receiving a request to modify a configuration of one of the network devices. The method additionally includes applying the requested modification to a model of the network device and synchronizing the model of the network device to the network device.

Another aspect is directed to a management device for managing a network device. The management device includes logic to store a configuration state of a model of the network device and logic to maintain a state machine to control the state stored by the logic to store the configuration state. The management device further includes logic to synchronize the model of the network device and the network device based on the state machine.

Yet another aspect is directed to a method for remotely managing a network device. The method includes receiving a request, at a network management application, to modify configuration information of the network device. The method also includes receiving an indication that configuration information of the network device has been changed by an entity other than the network management application. Further, the method includes keeping track of a current synchronization state of the network device and the network management application using a configuration-based state machine.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

As described herein, a network device management application may manage a number of network devices. Configuration changes in the network devices, such as out-of-band changes or changes by the network management application, are synchronized by the network management application using a configuration-based state machine to keep track of the synchronization state of each of the network devices. The state machine includes a synchronization pending state that represents synchronization between the network management application and the network devices that have not yet been resolved.

Exemplary System Overview

Figure 1:
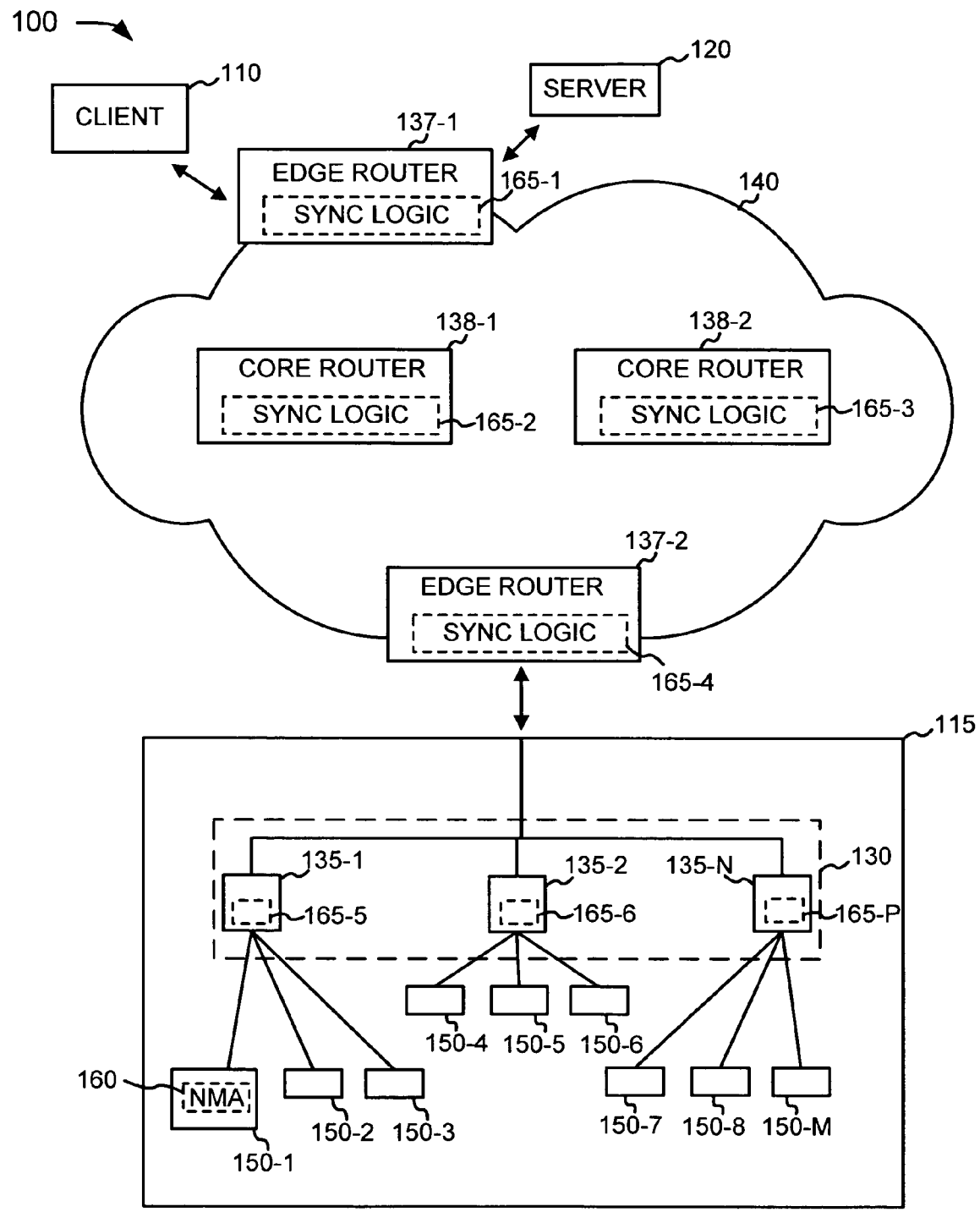
FIG. 1 is an exemplary diagram of a system in which concepts consistent with the principles of the invention may be implemented.

FIG. 1 is an exemplary diagram of a system 100 in which concepts consistent with the principles of the invention may be implemented. System 100 may include multiple entities, such as client 110, proprietary network 115 (e.g., a corporate network), and server device 120. Client 110, proprietary network 115, and server 120 may connect to one another via a network 140. Network 140 may include a local area network (LAN), a wide area network (WAN), an intranet, the Internet, or a combination of these or other networks. In one implementation, network 140 may include a packet-based network that includes a number of routers or other switching devices, such as edge routers 137-1 and 137-2, and core routers 138-1 and 138-2.

A single client 110, proprietary network 115, and server 120 have been illustrated as connected to network 140 for simplicity. In practice, there may be more clients, servers, and proprietary networks.

Proprietary network 115 may include, for example, a corporate network that connects clients 150-1 to 150-M (referred to collectively as clients 150) to network 140 via a gateway 130. A gateway can generally be thought of as a network point that acts as an entrance to another network. Gateway 130 may include a number of network devices, such as firewall devices 135-1 through 135-N (referred to collectively as firewall devices 135). Clients 150 of proprietary network 115 may connect to network 140 through firewall devices 135 of gateway 130.

Client 110 and clients 150 may include a device such as a personal computer, a wireless telephone, a personal digital assistant (PDA), a lap top, or another type of computation or communication device, a thread or process running on one of these devices, and/or an object executable by one of these devices. Server 120 may include a server device that processes, searches, and/or maintains information and provides such information to client 110 and clients 150.

A number of the network devices shown in FIG. 1 may be managed from a management application. This management application is illustrated in FIG. 1 as network management application ("NMA") 160. NMA 160 may generally be a software application executing at one or more of the clients shown in FIG. 1. For example, NMA 160 may be an application executing at client 150-1, such as an application that interacts with an administrator at client computer 150-1 through a graphical user interface. NMA 160 may be used to manage network devices such as firewalls 135, edge routers 137, and core routers 138. One of ordinary skill in the art will recognize that other devices could be managed by NMA 160. NMA 160 may communicate with each of the network devices it is managing and present a single interface through which administrators can control and monitor the network devices.

The network devices being managed by NMA 160 may each communicate with NMA 160. In the implementation shown in FIG. 1, synchronization logic ("sync logic") 165-1 through 165-P (collectively referred to as synchronization logic 165 or sync logic 165) is illustrated on edge routers 137, core routers 138, and firewalls 135. Synchronization logic 165 may be implemented as, for example, software designed for each of edge routers 137, core routers 138, and firewalls 135. Each synchronization logic 165 may communicate with NMA 160 to allow NMA 160 to manage the network device at which the synchronization logic is installed.

Figure 2:
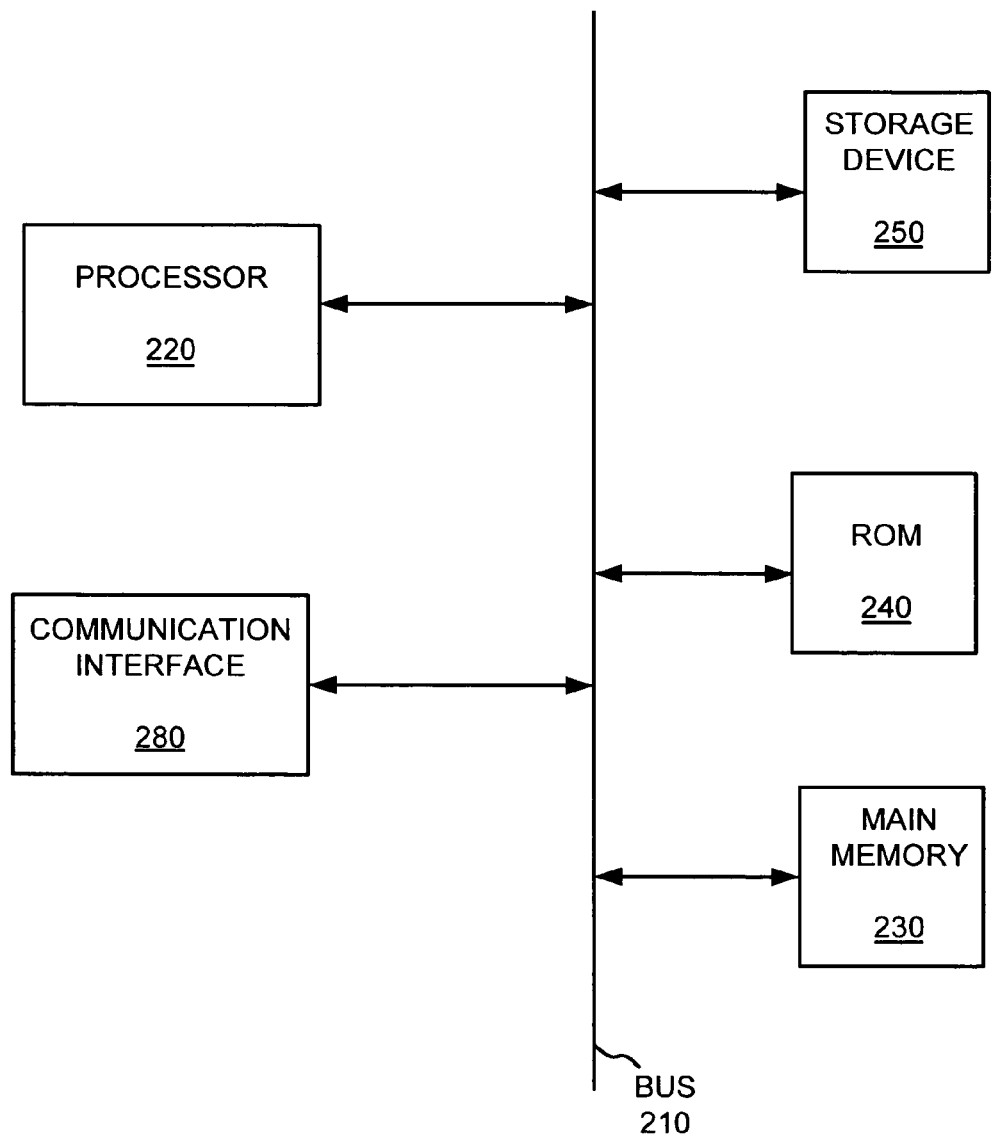
FIG. 2 is an exemplary diagram of a client, server, or other network device, such as a firewall or a router.

FIG. 2 is an exemplary diagram of a computing device 200, which may represent one of clients 110/150, server 120, or another network device, such as a firewall 135, an edge router 137, or a core router 138. Computing device 200 may include a bus 210, a processor 220, a main memory 230, a read only memory (ROM) 240, a storage device 250, and a communication interface 280. Processor 220 may include a processor, microprocessor, or processing logic that interpret and execute instructions. Main memory 230 may include a random access memory (RAM) or another type of dynamic storage device that stores information and instructions for execution by processor 220. ROM 240 may include a ROM device or another type of static storage device that stores static information and instructions for use by processor 220. Storage device 250 may include a magnetic and/or optical recording medium and its corresponding drive.

Communication interface 280 may include any transceiver-like mechanism that enables computing device 200 to communicate with other devices and/or systems. For example, communication interface 280 may include mechanisms for communicating with another device or system via a network, such as network 140.

Computing device 200 may implement a number of functions, described in more detail below, using software instructions read into memory 230 from another computer-readable medium, such as data storage device 250, or from another device via communication interface 280. The software instructions contained in memory 230 may cause processor 220 to perform processes that will be described later. More particularly, as mentioned above, the software instructions contained in memory 230 may implement synchronization logic 165 and/or NMA 160. Alternatively, hardwired circuitry or other logic may be used in place of, or in combination with, software instructions to implement processes consistent with the invention. Thus, implementations consistent with the principles of the invention are not limited to any specific combination of hardware circuitry and software.

In general, NMA 160, when managing network devices 135, 137, and 138, faces two significant issues in ensuring that its view of each network device is synchronized with the actual configuration information of the network device: (1) updating devices that are offline when a network administrator requests that the device be updated, and (2) updating devices that go offline before NMA 160 is able to complete a synchronization with the network device. Additionally, because network devices may be changed out-of-band, NMA 160 needs to be aware of the possibility that configuration changes may be made at both the network device and NMA 160. In this situation, NMA 160 should only update changes that are authorized to be made at the network device and at NMA 160.

Network Devices

Figure 3:
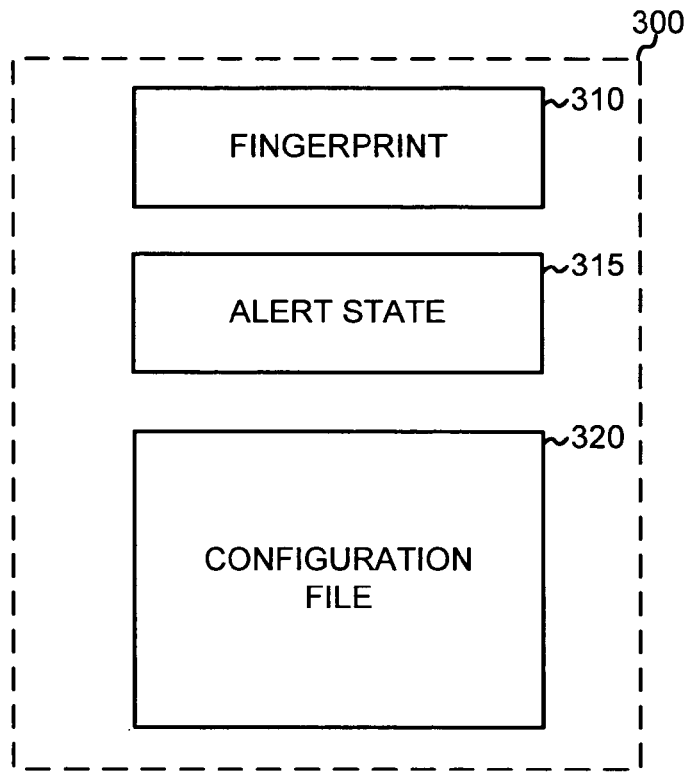
FIG. 3 is a diagram illustrating an exemplary data structure of a network device.
Figure 4:
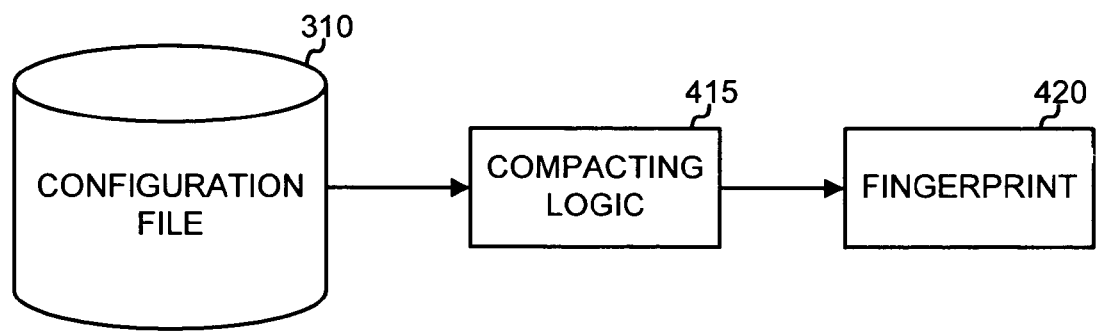
FIG. 4 is a diagram illustrating creation of an exemplary fingerprint based on configuration information of a network device.

Before describing the operation of NMA 160 and network devices 135, 137, and 138 in synchronizing with one another, the network devices will be described in more detail with reference to FIGS. 3 and 4. In the discussion of FIGS. 3 and 4, network device 137-1 will be used as an exemplary network device. In practice, each of network devices 135, 137, and 138 may include similar features.

Synchronization logic 165-1 of network device 137-1 may store one or more data structures. FIG. 3 is a diagram illustrating an exemplary data structure 300 that may be implemented by network device 137-1. Data structure 300 may be stored in computer-readable memory, such as storage device 250 or main memory 230 of network device 137-1. Data structure 300 may include a fingerprint field 310, an alert state field 315, and configuration file 320. Fingerprint field 310 may be used to store a fingerprint that compactly represents the configuration information for the network device. Alert state field 315 may store state information relating to out-of-band configuration changes at network device 137-1. Configuration file 320 may be, for example, a file including the configuration options for the network device.

Configuration file 320 may include numerous properties or options that are configurable for the network device. For a router, such as edge router 137-1, for instance, the configurable information may relate to the routing protocols used by the router, traffic policies applied by the router, security policies of the router, etc. One of ordinary skill in the art will recognize that, in general, configuration information for a network device may be stored in a form other than a file, such as a data structure resident in random access memory.

FIG. 4 is a diagram illustrating creation of a fingerprint representing configuration file 320. Configuration file 320 may be a relatively large file. Compacting logic 415 may apply a compacting function to configuration file 320 to generate fingerprint 420.

Numerous different compacting functions may be implemented by compacting logic 415 to obtain a suitable fingerprint. In general, a suitable compacting function, for a given device configuration file 320 of arbitrary size, should generate a practically unique fingerprint 420. Compacting logic 415 may, for example, apply a hash function to configuration file 410 to generate a predetermined length output hash value (e.g., a 64-bit output value) that can be used as fingerprint 420. Fingerprint 420 functions as a compact representation of configuration file 320.

Network device 137-1 may store fingerprint 420 in fingerprint field 310 and may transmit the fingerprint to NMA 160 when network device 137-1 initially comes online with respect to NMA 160. A network device coming online, as used herein, refers to the network device and NMA 160 initiating communication for the first time or after a previous break in communication. Network device 137-1 coming online may, for example, indicate network device 137-1 is initially turned on, indicate NMA 160 is initially turned on, or indicate a network link that was previously down between NMA 160 and network device 137-1 is restored. NMA 160 receives the fingerprint from network device 137-1 and may then compare the received fingerprint with a previous version of the fingerprint received from network device 137-1, such as a version of the fingerprint received from network device 137-1 when the network device was previously connected with NMA 160. If the fingerprints do not match, NMA 160 infers that network device 137-1 was changed out-of-band while it was offline.

In alternate implementations, techniques that do not use fingerprint 420 may be used to determine whether network device 137-1 was changed out-of-band while it was offline. For example, when a device comes online, it may transmit its complete configuration file 320 to NMA 160. Alternatively, network device 137-1 and NMA 160 may use a timestamp to determine when configuration changes are made.

Network device 137-1 and NMA 160 may use alert state field 315 to assist in synchronizing NMA 160 and network device 137-1 while network device 137-1 is online with respect to NMA 160. When an out-of-band change is made to network device 137-1 while network device 137-1 is online, network device 137-1 may send an alert message to NMA 160 indicating that a change has been made to its configuration information. Additionally, network device 137-1 may enter an "alert sent" state. Alert state field 315 may be set by network device 137-1 to thereby indicate that it is in the alert sent state. While in the alert sent state, additional out-of-band changes made to network device 137-1 do not cause an alert message to be sent to NMA 160. In other words, while in the alert sent state, network device 137-1 refrains from transmitting alert messages to NMA 160. At some point, NMA 160, in response to receiving the alert message, will contact network device 137-1 and synchronize with the network device. At this point, alert state field 315 may be reset to indicate that an alert message needs to be sent in response to additional configuration changes made to the network device.

In alternate implementations, detecting out-of-band changes to network device 137-1 while network device 137-1 is online may be made using techniques that do not use alert state field 315. For example, NMA 160 may periodically poll network device 137-1 to determine whether it has been changed out-of-band.

NMA 160

Figure 5:
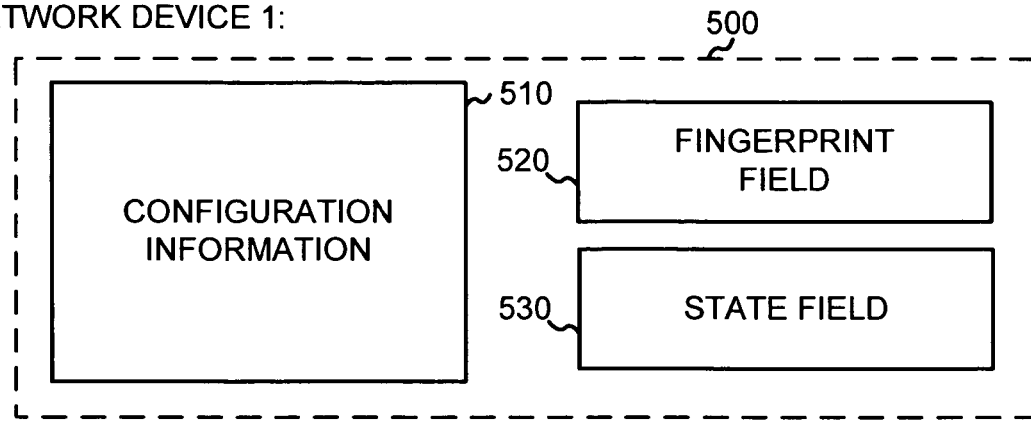
FIG. 5 is a diagram illustrating an exemplary data structure of the network management application shown in FIG. 1.
Figure 5:
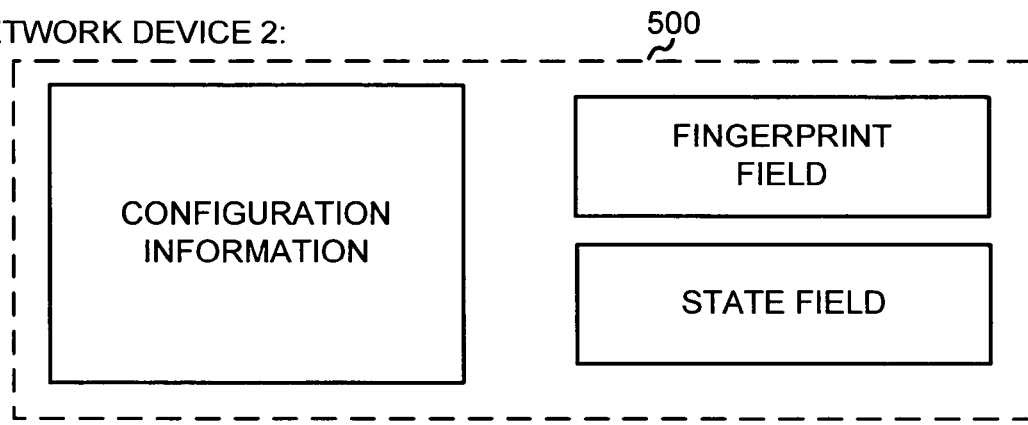
Figure 5:
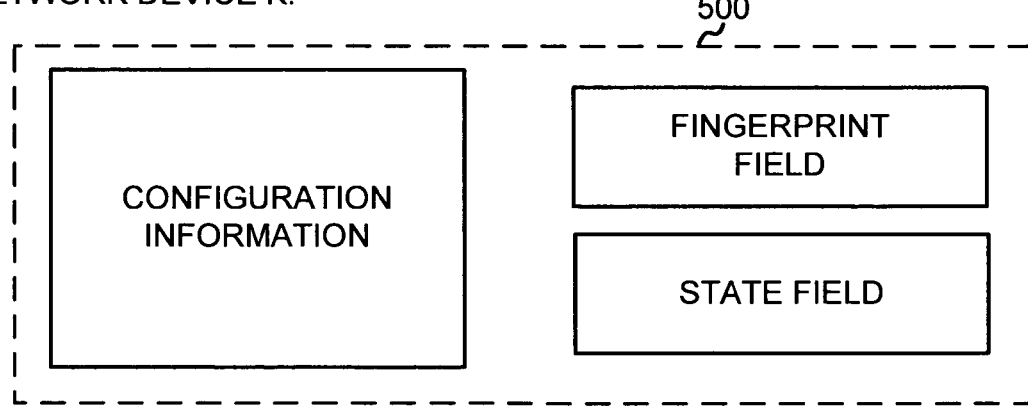

As with network devices 135, 137, and 138, NMA 160 may also store data structures that are used when synchronizing with the network devices. FIG. 5 is a diagram illustrating exemplary data structures 500 used by NMA 160, which may be stored in computer-readable memory, such as storage device 250 or main memory 230 of NMA 160. NMA 160 may store a similar data structure 500 for each network device it is managing (labeled as network devices 1 through K in FIG. 5). Each data structure 500 may include configuration information 510 for the network device, fingerprint field 520 for storing a fingerprint of the network device, and a state field 530 that may be used to store a state of a configuration-based state machine. In general, NMA 160 may implement the configuration-based state machine to assist in synchronizing its view of the configuration profile of a network device to the actual configuration profile of the network device.

Configuration information 510 may store the configuration profile of a network device. When an administrator using NMA 160 makes a change to a network device, NMA 160 may display the status of the device to the administrator as if the change has been made to the network device even when NMA 160 has not yet updated the actual network device. This virtual version of the network device will be referred to as the model network device herein while the actual network device will be referred to as the real network device or, more simply, the network device. Configuration information 510 may reflect a configuration profile of both the model and the real network device.

Fingerprint field 520 may store a fingerprint received from the network device. When NMA 160 receives a new and different fingerprint from a network device, NMA 160 can infer that the configuration profile of the network device has changed.

Figure 6:
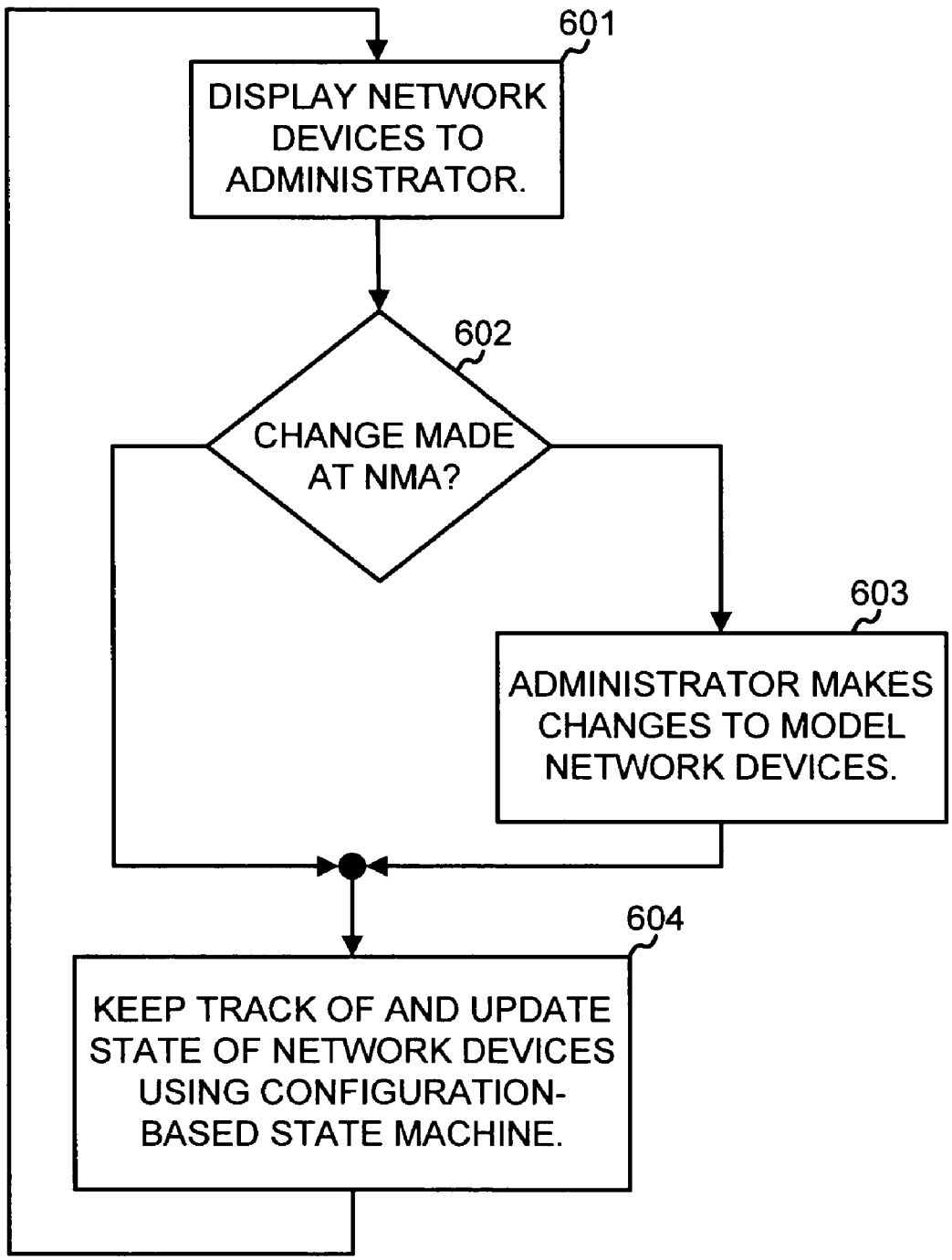
FIG. 6 is a flow chart illustrating exemplary operations of the network management application.

FIG. 6 is an flowchart illustrating exemplary operations by which NMA 160 allows network administrators to monitor and configure the network devices that connect to NMA 160. NMA 160 may present information about the network devices that are being managed by NMA 160 to the network administrator (act 601). For example, NMA 160 may graphically illustrate the network devices being managed and the state of each of the network devices (e.g., online, offline, experiencing high congestion, etc.).

An administrator may wish to make changes to the configuration information of one of the network devices (act 602). If so, the administrator may enter changes for one or more of the model network devices (act 603). Because it takes a non-zero amount of time to update the network devices or synchronize the model network devices to the real network devices, there may be delay in synchronizing the changes entered by the administrator to the model network devices with the real network devices. By presenting the user with a model network device at which changes can be made, the user can interact with all of the network devices being managed by NMA 160, even if not all of them are online.

NMA 160 may next synchronize the network devices (act 604). The network devices may be synchronzied based on the use of a configuration-based state machine to keep track of the updating state of each of the network devices (see FIG. 7, described below). In general, with the configuration-based state machine, both configuration changes made at NMA 160 and out-of-band changes made directly with the network devices are managed and synchronized with the network devices and NMA 160. As used herein, updating a network device refers to "pushing" information from NMA 160 to the network device while "importing" refers to retrieving information from the network device by NMA 160. Synchonizing or synchronization may refer to either or both updating and importing information so that the network device and NMA 160 are in agreement about the configuration information for the network device.

Figure 7:
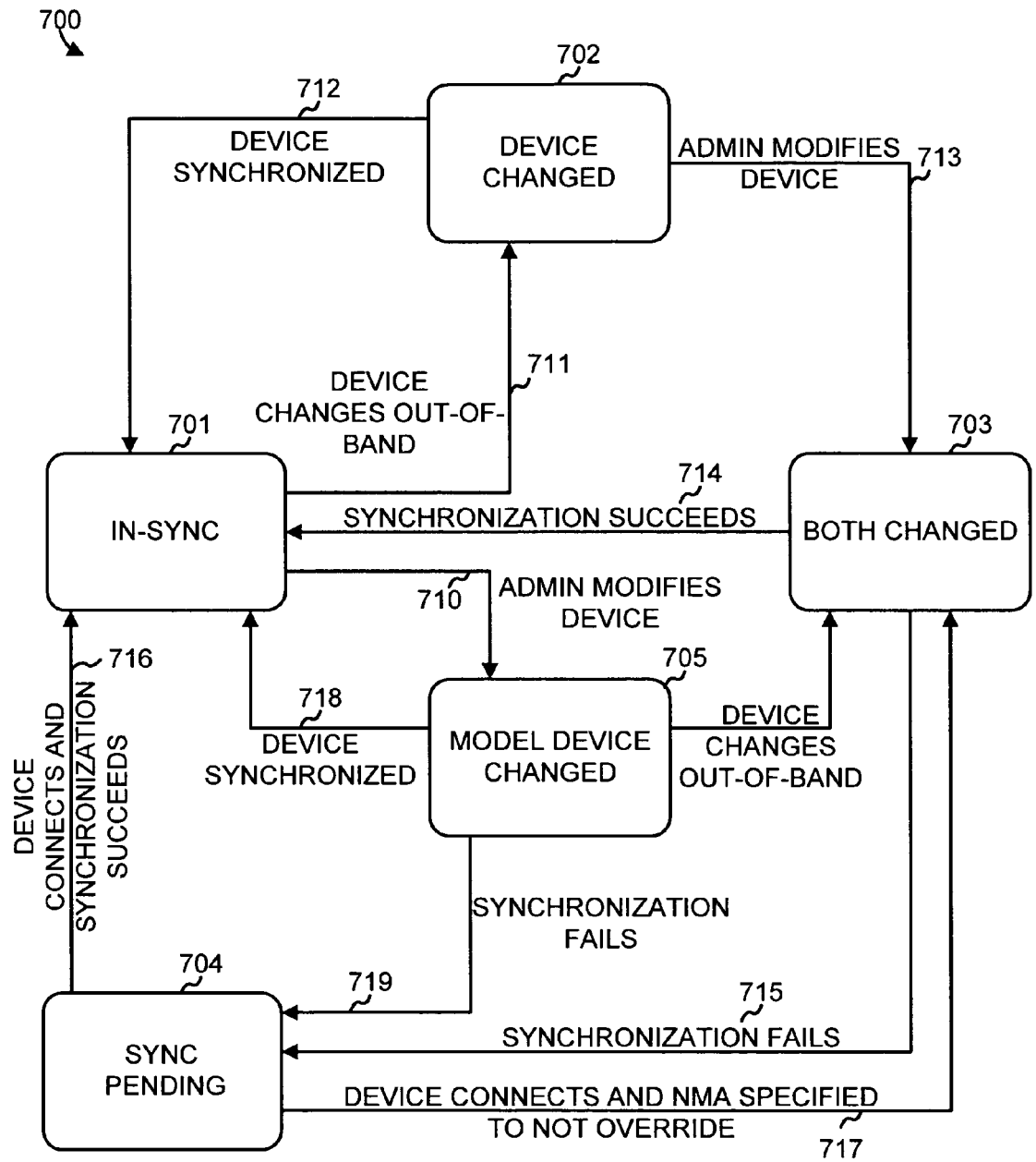
FIG. 7 is a diagram illustrating a configuration-based state machine.

FIG. 7 is a diagram illustrating an exemplary implementation of a configuration-based state machine 700 used in synchronizing the network devices and NMA 160 in act 604. NMA 160 may keep track of the current state of each of the network devices using state field 530.

Assume that a network device, such as network device 137-1, is in the "in-sync" state 701. When in this state, the configuration information of the network device and of NMA 160 is synchronized. In other words, the model network device is synchronized with the real network device. A network device leaves state 701 when its configuration information is changed at either NMA 160 (act 710) or by an out-of-band change at the network device (act 711). Configuration changes by an administrator at NMA 160 will, of course, be directly known by NMA 160. Out-of-band changes to the network device can be detected by, as previously discussed, a change in the fingerprint for a device when it first comes online or an alert message sent from the device when an out-of-band change is made when the network device is already online or using other techniques to detect out-of-band changes.

A device change out-of-band from in-sync state 701 puts the model device in "device changed" state 702. When in this state, NMA 160 knows that the device has been changed out-of-band but the specific change has not yet been synchronized (e.g., imported) to NMA 160. One event that may take the network device out of state 702 is that NMA 160 may import the out-of-band change and change configuration information 510 at NMA 160 to reflect the change (act 712). In some implementations, arbitration rules may be predefined by the network administer that govern which out-of-band changes are valid, which changes by NMA 160 are allowed, and how to handle conflicts in out-of-band changes and changes by NMA 160.

Another event that may take the network device out of state 702 is that the network device may be changed at NMA 160 (act 713). In this situation, the network device will have received both out-of-band changes and changes from NMA 160, putting the network device in "both changed" state 703. From both change state 703, NMA 160 will attempt to synchronize both changes with the network device (act 714).

The synchronization in act 714 will fail if the network device is not connected (act 715). In this situation, the model network device enters "sync pending" state 704. Sync pending state 704 indicates that the network device is offline and thus currently unavailable to be synchronized. When the network device later connects, NMA 160 will attempt to synchronize with the network device. If the network device has not been changed out-of-band, the synchronization should succeed (act 716) and the network device will be placed back to in-sync state 701. If the network device connects and has been changed out-of-band, however, the synchronization may either succeed (act 716) or fail (act 717) depending on the predefined arbitration rules. If, for example, the system is configured such that out-of-band changes override changes at NMA 160, the synchronization may fail and the model network device will enter both changed state 703 (act 717).

Referring back to in-sync state 701, assume that an administrator modifies the model network device (act 710). In this situation, the model network device enters "model device changed" state 705. From this state, the network device may be successfully updated to reflect the change to the model device (act 718) or, if the real network device is not connected, the update may fail, placing the model network device in state 704 (act 719). Additionally, while in model device change state 705, the network device may change out-of-band, placing the model network device in both changed state 703.

Configuration-based state machine 700, as discussed above, provides for the synchronization of a model network device with a real network device.

CONCLUSION

The foregoing description of exemplary embodiments of the invention provides illustration and description, but are not intended to be exhaustive or to limit the invention to the precise form disclosed. Modifications and variations are possible in light of the above teachings or may be acquired from practice of the invention.

For example, while a series of acts have been described with regard to FIGS. 6 and 7, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for administrating network devices comprising:
    presenting a management interface through which a plurality of network devices is managed, where each of the network devices is associated with a respective configuration file;
    receiving a request to modify the respective configuration file of one of the plurality of network devices;
    applying the requested modification to the one of the plurality of network devices; and using a state machine to monitor a synchronization state of the one of the plurality of network devices, where the state machine determines, based on a value derived from the respective configuration file, that the requested modification, of the one of the plurality of network devices, was implemented while the one of the plurality of network devices was not connected with the management interface.

2. The method of claim 1, where the one of the plurality of network devices includes a firewall or a router.

3. The method of claim 1, where the management interface includes a network management application executing on a client computing device.

4. A management device for managing a network device comprising:
   computer-implemented logic to store configuration information about the network device;
   computer-implemented logic to store a configuration state of a model of the network device;
   computer-implemented logic to maintain a state machine to control the state stored by the logic to store the configuration state; and
   computer-implemented logic to synchronize the model, of the network device, and the network device based on the state machine and to synchronize the network device with the management device, where the state machine determines, based on a value derived from the configuration information, that the network device was modified while the network device was not connected with the management device.

5. The device of claim 4, where the state machine includes a state that represents a change in the configuration information of the model, of the network device, by an administrator using the management device.

6. The device of claim 4, where the state machine includes a state that represents a change in the configuration information, of the model of the network device, by both an administrator using the management device and an out-of-band change from the network device.

7. The device of claim 4, where the state machine includes a state that represents synchronization in the configuration information of the model of the network device and the network device.

8. The device of claim 4, where the network device includes a firewall or a router.

9. The device of claim 4, where the state machine includes a synchronization pending state that represents a state in which the model, of the network device, has a pending configuration change and the network device is not connected with the management device.

10. A method for remotely managing a network device comprising:
    receiving a request, at a network management application, to modify configuration information of the network device;
    receiving an indication that configuration information of the network device has been changed by an entity other than the network management application; and
    monitoring, using a configuration-based state machine, a current synchronization state of the network device and the network management application, in response to the received request and the received indication, where the configuration-based state machine determines, based on a value derived from the configuration information, that the requested modification was implemented while the network device was not connected with the network management application.

11. The method of claim 10, further comprising:
    synchronizing the network management application and the network device based on a configuration state determined by the configuration-based state machine.

12. The method of claim 10, where the configuration-based state machine includes a synchronization pending state that represents a state in which the request or the indication is pending and the network device is not connected with the network management application.

13. A network management device comprising:
    a processor; and
    a memory to store instruction that when executed by the processor, cause the processor to:
    present a management interface through which a plurality of network devices are managed, where each of the network devices is associated with a respective configuration file;
    receive a request to modify the respective configuration file of one of the plurality of network devices;
    receive an indication that the respective configuration file of the network device, has been changed by an entity other than the network management device;
    apply the requested modification to a model of the one of the plurality of network devices;
    synchronize configuration information, of the model of the one of the plurality of network devices, to the respective configuration file of the one of the plurality of network devices, and
    monitor via a state machine, a synchronization state of the model, of the one of the plurality of network devices, and the one of the plurality of network devices and the synchronization state of the one of the plurality of network devices and the network management device, where the state machine determines, based on a hash value derived from the respective configuration file, that the requested modification was implemented while the network device was not connected with the management interface.

14. The method of claim 1, further comprising:
    receiving, by the management interface, a second request to modify the configuration of the one of the plurality of network devices;
    applying the second requested modification to a model of the one of the plurality of network devices; and
    synchronizing the model of the one of the plurality of network devices to the one of the plurality of network devices.

15. The method of claim 14, further comprising:
    using the state machine to keep track of a synchronization state of the model of the one of the plurality of network devices and the one of the plurality of network devices.

16. The method of claim 15, where the state machine includes a synchronization pending state that represents a state in which the model, of the one of the plurality of network devices, has a configuration change pending and the one of the plurality of network devices is not connected with the management interface.

17. The method of claim 15, where the state machine includes a state that represents a change in the configuration information of the model, of the one of the plurality of network devices, by an administrator from the management interface.

18. The method of claim 15, where the state machine includes a state that represents a change in the configuration of the model, of the one of the plurality of network devices, by both an administrator from the management interface and from an out-of-band change by the one of the plurality of network devices.

19. The method of claim 15, where the state machine includes a state that represents synchronization in the configuration of the model, of the one of the plurality of network devices, and the one of the plurality of network devices.

* * * * *